Fig. 1.
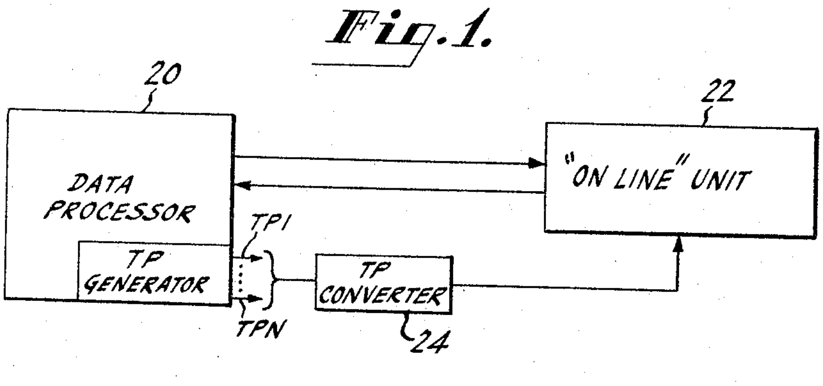
Fig. 2.
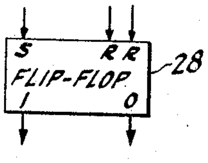
Fig. 5.
| | (1) | (0) |
|---|---|---|
| RESET | H | L |
| SET | L | H |
Fig. 3.
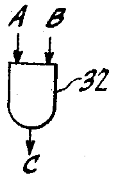
Fig. 6.
| A | B | C |
|---|---|---|
| L | L | H |
| H | L | L |
| L | H | L |
| H | H | L |
Fig. 4.
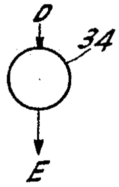
Fig. 7.
| D | E |
|---|---|
| L | H |
| H | L |
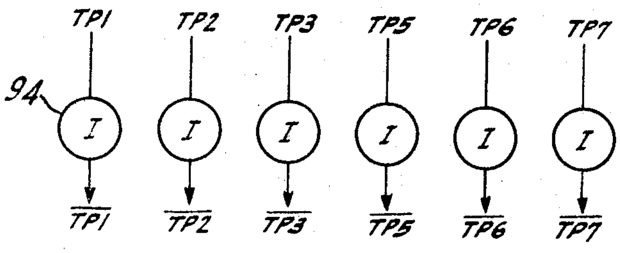
Fig. 11.
INVENTOR.
ROBERT A. RODNER
BY John V. Regan
Attorney INVENTOR.
ROBERT A. RODNER
BY John V. Regan
Attorney INVENTOR.
ROBERT A. RODNER
BY John V. Regan
Attorney INVENTOR.
ROBERT A. RODNER
BY John V. Regan
Attorney United States Patent Office 3,320,539
Patented May 16, 1967

3,320,539

PULSE GENERATOR EMPLOYING A CONTROLLED OSCILLATOR DRIVING A SERIES OF GATES AND EACH BEING CONTROLLED BY EXTERNAL TIMING SIGNALS

Robert A. Rodner, Lake Park, Fla., assignor to Radio Corporation of America, a corporation of Delaware
Filed Mar. 11, 1964, Ser. No. 351,132
5 Claims. (Cl. 328—62)

This invention relates generally to pulse generators and, in particular, to apparatus responsive to a first set of timing signals for generating a second set of signals, greater in number, during the same time period.

It frequently is desirable to interconnect two equipments having different timing or clock pulse requirements. By way of example, it may be desired to couple a piece of peripheral apparatus on-line to a data processor. The peripheral apparatus could be a high speed printer, another processor, or the like. One equipment may be arranged to control the timing of the other equipment, by means of a common timing pulse generator, to assure that both equipments operate in synchronism. However, a problem arises when the controlled equipment requires, for its proper operation, a greater number of timing or clock pulses per operating cycle than is available from the data processor, even though an operating cycle is of the same duration in both equipments.

It is one object of this invention to provide an improved pulse generator.

It is another object of this invention to provide apparatus for synchronizing the operations of two equipments that have different timing pulse requirements.

It is still another object of this invention to provide apparatus that is responsive to a first set of timing pulses, each of a first duration, for generating a second, larger number of pulses each having a second, shorter duration.

In accordance with the present invention, a set of output pulses each having a duration X is generated from a set of input pulses each having a duration $Y>X$. At least one of the input pulses is applied to control a square-wave oscillator means that has a period 2X, and that provides first and second outputs which are out-of-phase. One of the oscillator outputs is applied to the inputs of first ones of a set of coincidence gates, and the second output of the oscillator means is applied to the inputs of the remaining ones of the gates. Other inputs to the gates are controlled by various ones of the set of input pulses.

In the accompanying drawing, like reference characters denote like components, and:

FIGURE 1 is a block diagram illustrative of a system in which the invention may be embodied;

FIGURES 2, 3, and 4 illustrate symbols which are used in the drawing to represent various logic devices;

FIGURES 5, 6 and 7 are "truth" tables for the devices represented by the symbols in FIGURES 2, 3 and 4, respectively;

FIGURE 11 is a set of inverters which may be used in the system of FIGURE 10 for providing inverted input pulses.

Figure 9:
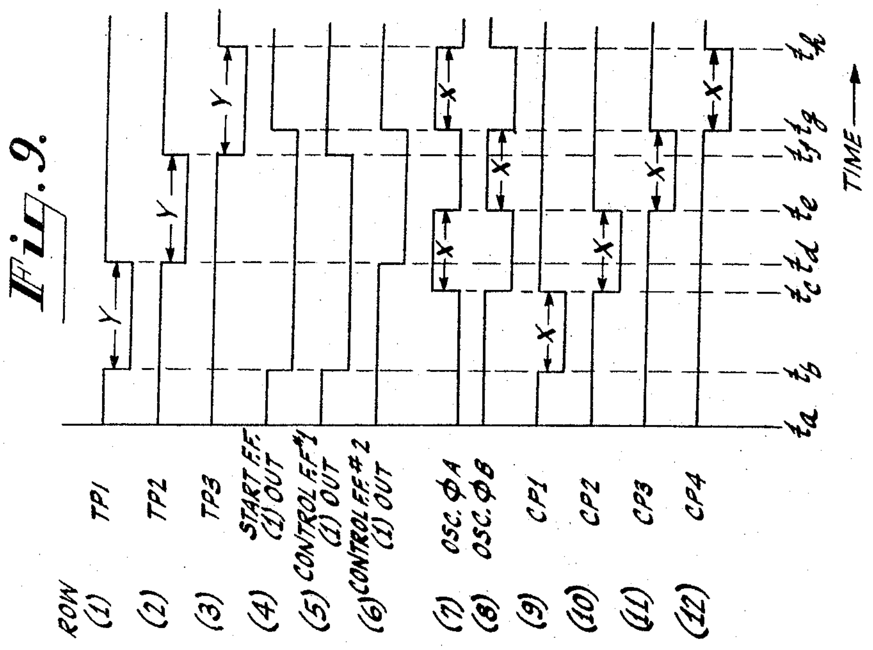
FIGURE 9 is a timing diagram of waveforms useful in describing the operation of the FIGURE 8 pulse generator.

In the system of FIGURE 1, the block 20 represents a data processor which may be, for example, a high speed digital computer. As is known, a computer may be connected to receive information from, and supply information to, a large number of peripheral apparatus such as printers, card and tape machines, and the like. The block 22 represents one such peripheral apparatus. The operation of a peripheral apparatus should be synchronized with the data processor so that there is no loss of information during transfer.

Most data processors have a central clock or timing pulse generator which provides, for each operating cycle of the data processor, a set of timing or clock pulses. Each timing pulse of the set appears on a different control line and may be used to control a different operation or set of operations in the data processor. Synchronism between the data processor and the peripheral apparatus may be achieved in some applications by supplying these timing pulses to the peripheral apparatus to control the latter's operation. In other applications, however, the peripheral apparatus requires a greater number of timing pulses per operating cycle than is available from the clock in the data processor, even though the operating cycle of the peripheral apparatus is of the same duration as that of the data processor. In that event, an apparatus 24, a timing pulse converter, labeled "TP converter," may be connected to receive the timing pulses from the data processor 20, and to convert these timing pulses into another set of timing pulses of greater number, during the same operating cycle, and to apply them to the on-line peripheral equipment 22.

Before describing the timing pulse converter 24 in detail, certain symbols used to represent logical elements in the system will first be discussed. The symbol 28 illustrated in FIGURE 2 represents a set-reset flip-flop of the type which has set (S) and reset (R) input terminals, and corresponding (1) and (0) output terminals, respectively. The flip-flop may be set by applying an input pulse of the proper polarity and amplitude at the (S) input terminal, and may be reset by applying a pulse of the same amplitude and polarity at the reset input terminal.

The flip-flop is shown in FIGURE 2 as having two reset input terminals, whereby the flip-flop may be reset from different signal sources. It should be understood that these two reset inputs may be coupled to the same terminal in the flip-flop as, for example, by an OR gate. The OR gate is assumed to be within the flip-flop 28 and is, therefore, not illustrated. In a computer system, bi-valued signals or levels are employed. One level may represent a binary "one" and the other level may represent a binary "zero." The timing pulse generator does not handle binary one and zero data signals as such and, for this reason, the two signal levels are described here as being either high (H) or low (L), without defining which represents a "one" and which represents a "zero." A high (H) signal is one which is more positive, relatively speaking, than a low (L) signal.

A "truth" table for the flip-flop 28 is given in FIGURE 5. The flip-flop is set or reset, respectively, when a high input signal is applied to the (S) or (R) input terminals. The (1) and (0) outputs are high and low, respectively, when the flip-flop is reset, and are low and high, respectively, when the flip-flop is set.

The symbol 32 illustrated in FIGURE 3 is used throughout the drawing to represent a two-input coincidence gate. A coincidence gate, for present purposes may be defined as a gate having a number of inputs and a single output, characterized in that the output is in a specified state only when all of the inputs have the same predetermined value. The gate 32 is chosen to be a so-called NOR gate for high (H) inputs.

A truth table for the NOR gate 32 is given in FIGURE 6. As shown there, the output C of the gate is highly only when both of the A and B inputs are low. The output C is low whenever any input to the gate is high.

The symbol 34 in FIGURE 4 represents an inverter, or NOT gate. An inverter may be defined as a device which has one input and one output, characterized in that the output and the input are always opposite in sense. That is to say, when the input D is high, the output E is low, and vice versa, as shown in the truth table of FIGURE 7.

Figure 8:
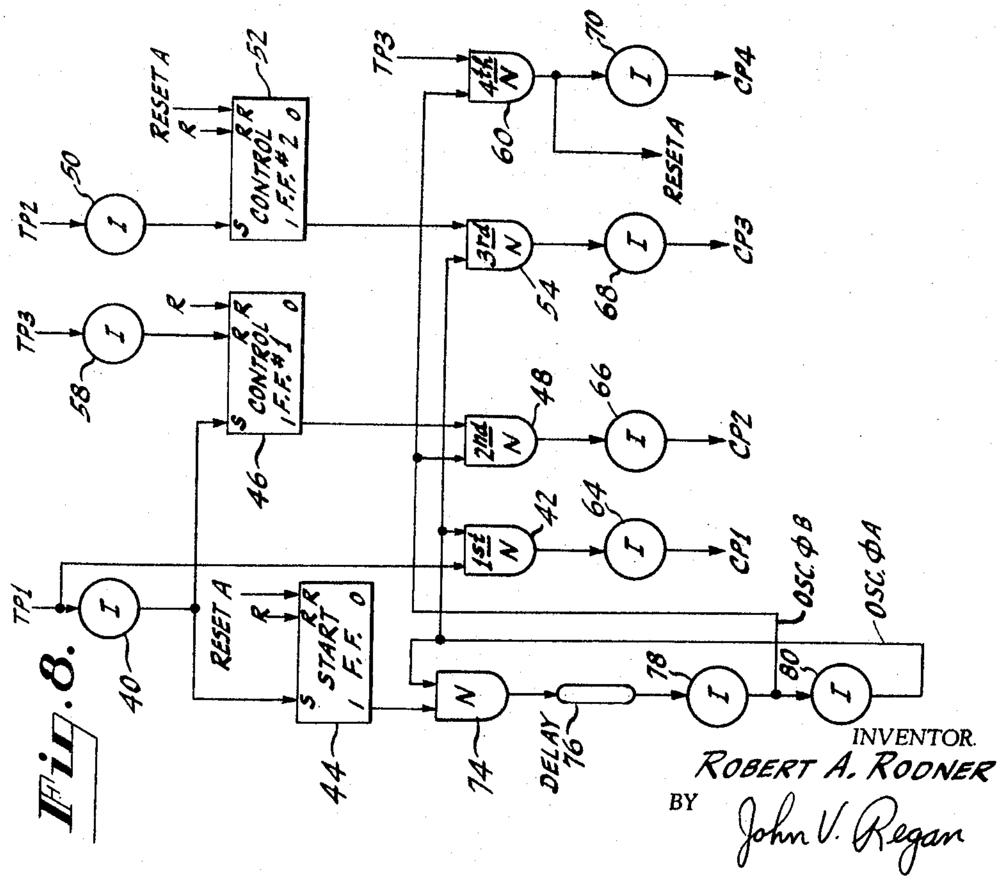
FIGURE 8 is a block diagram of a timing pulse generator embodying the invention.

A pulse generator suitable for use as the TP converter 24 of FIGURE 1 is illustrated in block form in FIGURE 8. The inputs to the pulse generator are timing pulses $TP_1$, $TP_2$ and $TP_3$ which, together, comprise a set of timing pulses which it is assumed are generated once for each operating cycle of the data processor. As may be seen in the timing diagram of FIGURE 9, the top three lines thereof, these three timing pulses occur successively in time, and do not overlap one another.

The first timing pulse $TP_1$ is applied as an input to an inverter 40, and as one input to a first NOR gate 42. The output of inverter 40 is applied to the set (S) input terminals of a start flip-flop 44 and a first control flip-flop 46. These flip-flops are set each time the first timing pulse $TP_1$ is applied to the inverter 40. The (1) output of the control flip-flop 46 is coupled to one input of a second NOR gate 48.

Second timing pulse $TP_2$ is applied through an inverter 50 to set a second control flip-flop 52, the (1) output of which is applied as an input to a third NOR gate 54. Third timing pulse $TP_3$ is applied through an inverter 58 to reset the first control flip-flop 46. This input pulse also is applied to a fourth NOR gate 60. Inverters 64, 66, 68, and 70 are connected at the outputs of the first, second, third, and fourth NOR gates, respectively, to provide clock pulses $CP_1 \ldots CP_4$ of the proper polarity.

Start flip-flop 44 controls a square-wave oscillator comprising a NOR gate 74, a delay means 76 and a pair of inverters 78 and 80 connected in tandem. The (1) output of start flip-flop 44 and the output of inverter 80 are applied as inputs to the NOR gate 74. The outputs of the oscillator are taken at the outputs of the inverters 78 and 80. These two outputs are opposite in phase because of the inverter 80. The output of oscillator 80 is applied as an input to the first and third NOR gates 42 and 54. Inverter 78 has its output applied to the second and fourth NOR gates 48 and 60.

The operation of the oscillator will now be described. Start flip-flop 44 normally is in the reset state, whereby the (1) output thereof is high. NOR gate 74 has a low output whenever any input thereto is high. This output is delayed in the device 76 and inverted by the inverter 78. Thus, the output of inverter 78 normally is high and the output of inverter 80 normally is low. No pulses are generated by the oscillator so long as the start flip-flop 44 is reset.

When start flip-flop 44 becomes set, the (1) output thereof goes low and both inputs to NOR gate 74 then are low. As shown in the truth table of FIGURE 6, a NOR gate has a high output when both inputs are low. This high output is delayed for a period D in the delay device 76 and then inverted by inverter 78. Thus, the output of inverter 78 becomes low after a delay D following the setting of start flip-flop 74. This output is inverted in the inverter 80 and fed back as a high input to the NOR gate 74, switching the output of NOR gate 74 low. This low output is delayed for a period D in the device 76 and then inverted by the inverter 78. The high output of inverter 78 is inverted in the device 80 and fed back to the NOR gate as a low input. Both inputs to the NOR gate 74 then are low again and the output thereof goes high.

This sequence of events continues so long as the start flip-flop 74 remains set, whereby square-wave output pulses are provided at the outputs of the inverters 78 and 80. These two outputs are 180° out-of-phase because of the action of the inverter 80. That is to say, the output of inverter 78 goes high, and remains high for a period D. The output of inverter 80 is low during this period. The output of inverter 78 then goes low for a period D while the output of inverter 80 goes high for the same period. The frequency of the generated pulses is determined by the delay D provided by the delay device 76. As will become apparent as the discussion proceeds, this delay is chosen to be equal to the desired duration of the individual clock pulses $CP_1 \ldots CP_4$. That is to say, if each of these generated pulses has a duration X, then the delay device 76 is selected to provide a delay X. The period of oscillations is 2X, and the frequency of the square-wave oscillations is $1/2X$. During one cycle of oscillation, the output of inverter 78 goes through a complete cycle and provides one pulse of high amplitude and one pulse of low amplitude. The same is true for the output of inverter 80.

Consider now the operation of the pulse generator and refer to the timing diagram of FIGURE 9. Assume initially that all of the flip-flops 44, 46 and 52 were reset prior to time $t_a$ by appling a reset pulse R to all of the flip-flops. The (1) outputs of all of these flip-flops are high (rows 4, 5 and 6, FIGURE 9). The oscillator is inactive at this time, and the outputs of inverters 80 and 78 are low and high, respectively (rows 7 and 8). First timing pulse $TP_1$, having a duration Y, is applied at the set inputs of start flip-flop 44 and control flip-flop 46 at time $t_b$. Both of the (1) outputs thereof then become low (rows 4 and 5) and the oscillator becomes operative. The outputs of inverters 78 and 80, however, remain unchanged for a time X determined by the delay of the delay device 76. During this period, the output of inverter 80 remains low (row 7). This output, and the applied $TP_1$ timing pulse are applied to first NOR gate 42. Both inputs to the NOR gate 42 are low during the period $t_b$ to $t_c$, and the NOR gate 42 output is high during this period. This high output is inverted by the inverter 64 to provide a low level clock pulse $CP_1$ (row 9).

At $t_c$, the outputs of inverters 78 and 80 go low and high, respectively (rows 8 and 7). The low output of inverter 78 is applied as one input to second NOR gate 48. The remaining input to this NOR gate 48 also is low at this time because first control flip-flop 46 is in the set state. Accordingly, the output of second NOR gate 48 goes high at time $t_c$. This high output is inverted by inverter 66 to provide a low level clock pulse $CP_2$.

First timing pulse $TP_1$ terminates at time $t_d$. One input to first NOR gate 42 then goes high and prevents the further generation of $CP_1$ clock pulses during the operating cycle. Simultaneously, second timing pulse $TP_2$ is applied to the set (S) input of second control flip-flop 52. The (1) output thereof goes low (row 6) and is applied as one input to third NOR gate 54. The second input to this NOR gate 54 is the output of inverter 80, and this output is high at time $t_d$, whereby the output of the third NOR gate 54 remains unchanged. The outputs of inverters 78 and 80 change at time $t_e$, the output of inverter 78 going high and the output of inverter 80 going low (rows 8 and 7). Second NOR gate 48 then has a high input, whereby its output goes low to terminate the clock pulse $CP_2$ (row 10). However, the low output of inverter 80 applied to the third NOR gate 54 causes the output of NOR gate 54 to go high. This output is inverted by the inverter 68 to provide a low level clock pulse $CP_3$.

Second timing pulse $TP_2$ terminates and third timing pulse $TP_3$ begins at time $t_f$. The $TP_3$ input pulse resets the second controlled flip-flop 46 to disable second NOR gate 48 and thereby prevent any further generation of $CP_2$ clock pulses. Third timing pulse $TP_3$ also is applied as one input to the fourth NOR gate 60. The other input to this NOR gate 60 is the output of inverter 78, which is high at this time, whereby the output of fourth NOR gate 60 remains unchanged.

The outputs of inverters 78 and 80 change again at time $t_g$, the output of inverter 80 going high and the output of inverter 78 going low (rows 7 and 8). The high input to third NOR gate 54, from the output of oscillator 80, causes the output of NOR gate 54 to go low, terminating the $CP_3$ clock pulse (row 11). The low output of inverter 78 is applied to fourth NOR gate 60 and causes the output thereof to go high at $t_g$. This high output is inverted by the inverter 70 to provide a low level clock pulse $CP_4$.

The high output of fourth NOR gate 60 resets the second control flip-flop 52 at $t_g$, to prevent the further generation of $CP_3$ pulses, and also resets the start flip-flop 44 at the same time. The (1) output of the latter flip-flop 44 goes high (row 4), and no further square waves are generated by the oscillator after $t_h$. The change in the outputs of the oscillator at $t_h$ disables the fourth NOR gate 60 and terminates the $CP_4$ clock pulse.

In summary of the above description of FIGURE 8, it may be said that the apparatus generates a set of four clock pulses $CP_1$ . . . $CP_4$ of equal duration X in response to each set of three input timing pulses $TP_1$ . . . $TP_3$. Moreover, the four clock pulses are generated in the same time period during which the timing pulses are applied. The duration of X of each clock pulse is determined by the setting of the delay 76 in the oscillator.

Figure 10:
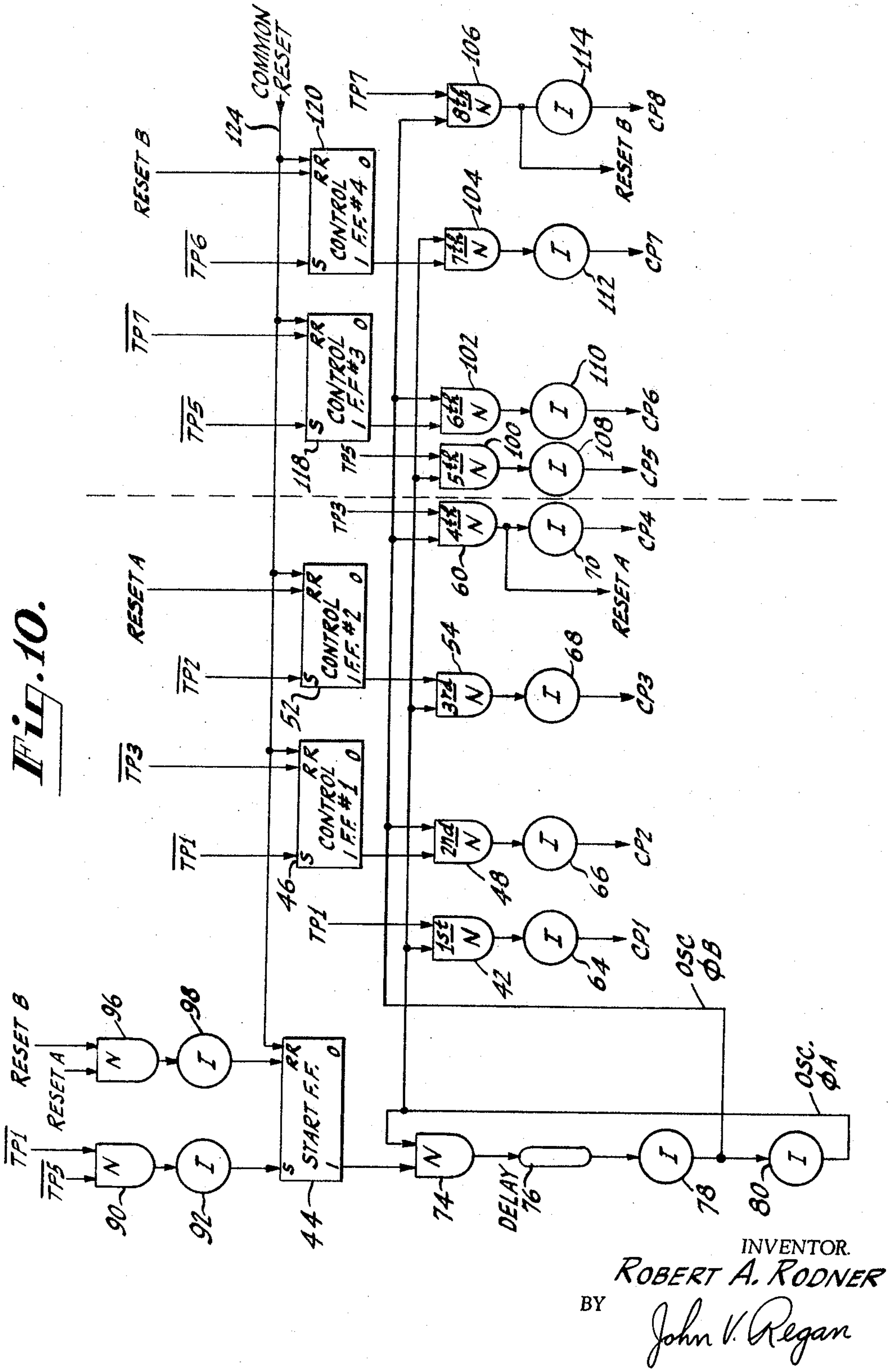
FIGURE 10 is a block diagram of another timing pulse generator embodying the invention.

Another pulse generator embodying the invention is illustrated in FIGURE 10. This generator is adapted to receive a series of seven input timing pulses, occurring during a given timing cycle, and to generate therefrom a series of eight pulses, of shorter duration, during the same timing cycle.

That portion to the left of the dashed vertical line in FIGURE 10 is the same as the apparatus of FIGURE 8, except for the inputs to some of the flip-flops. Input signals $\overline{TP}_1$ and $\overline{TP}_5$ are applied as inputs to a NOR gate 90, the output of which is inverted by inverter 92 and applied at the set (S) input terminal of start flip-flop 44. Input pulse $\overline{TP}_1$ is the inverted $TP_1$ input pulse supplied, for example, from the data processor. All other input pulses, to be described, which have a bar over the pulse designation will be understood to be the inverted pulses of the same designation without the bar, and may be provided by inverters of the type shown in FIGURE 11. $TP_1$, for example, is inverted by inverter 94 (FIGURE 11) to provide the $\overline{TP}_1$ pulse.

Pulses designated "reset A" and "reset B" are applied as inputs to a NOR gate 96, the output of which is supplied by an inverter 98 to one reset (R) input terminal of the start flip-flop 44. The reset A input is the previously mentioned output of fourth NOR gate 60. The origin of reset B input will be described hereinafter. First control flip-flop 46 receives the $\overline{TP}_1$ and $\overline{TP}_3$ pulses at its (S) and (R) input terminals, respectively. Second control flip-flop 52 receives the $\overline{TP}_2$ pulse and the reset A pulse at its (S) and (R) input terminals, respectively.

The remainder of the FIGURE 10 arrangement, to the right of the dashed vertical line, includes four NOR gates 100 . . . 106 having their outputs applied to inverters 108 . . . 114, respectively. The output of eighth NOR gate 106 is the previously mentioned "reset B" pulse supplied to the NOR gate 96. A pair of control flip-flops 118, 120 have their (1) outputs respectively connected to the inputs of the sixth and seventh NOR gates 102, 104. A second input to sixth NOR gate 102 is the output of the inverter 78 in the oscillator, and the second input to the seventh NOR gate 104 is the output of the inverter 80 of the oscillator. Fifth NOR gate 100 and eighth NOR gate 106 receive outputs from the inverters 80 and 78, respectively. Timing pulse $TP_5$ is applied as a second input to the fifth NOR gate 100 and timing pulse $TP_7$ is applied as a second input to the eighth NOR gate 106.

The $\overline{TP}_5$ and $\overline{TP}_7$ timing pulses are applied at the (S) and (R) input terminals of third control flip-flop 118, and the $\overline{TP}_6$ timing pulse and the reset B output of eighth NOR gate 106 are applied at the (S) and (R) input terminals, respectively, of the fourth control flip-flop 120. In addition, all of the flip-flops have one reset (R) input terminal connected in common to a common reset line 124.

Operation of the FIGURE 10 circuit will now be described with reference to the timing diagram of FIGURE 12. For purposes of illustration, it is assumed that each of the input timing pulses $TP_1$ . . . $TP_7$ (rows 1 through 7, FIGURE 12) has a duration of one $\mu$second, and that successive timing pulses neither overlap one another nor are spaced from one another. Stated in another way, it is assumed that one timing pulse begins at the same time the previous timing pulse terminates. The FIGURE 10 arrangement is adapted to generate a set of eight clock pulses $CP_1$ . . . $CP_8$ each having a duration of 0.75 $\mu$second, with a 1.0 $\mu$second space between the termination of the $CP_4$ pulse and the beginning of the $CP_5$ pulse. For this purpose, the delay 76 is selected to provide a delay of 0.75 $\mu$second, equal to the duration of a generated pulse. The oscillator then has a period of 1.5 $\mu$seconds during which one complete high level output and one low level output, each of 0.75 $\mu$second, appear at the output of each of the inverters 78 and 80.

Figure 12:
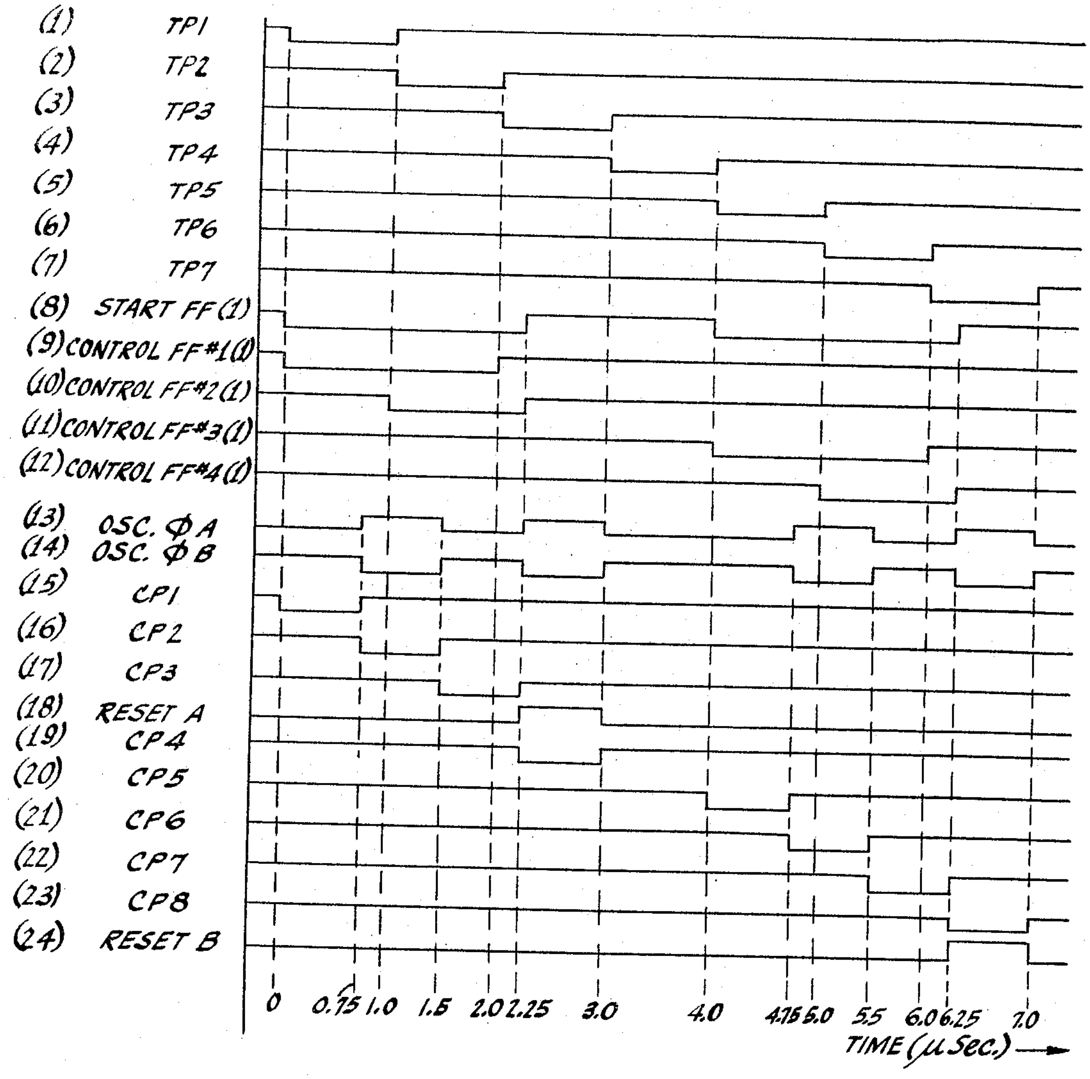
FIGURE 12 is a timing diagram for the pulse generator of FIGURE 10.

It is assumed that all of the flip-flops are reset prior to time $t_0$, which is used as a time reference in FIGURE 12. Consequently, the (1) outputs of all of the flip-flops are high. The oscillator is inactive at $t_0$ due to the high output from the start flip-flop 44 applied to NOR gate 74.

First timing pulse $TP_1$ is applied at time $t_0$ to the first NOR gate 42 (line 1). The output of inverter 80 is low at this time (row 13), whereby the output of first NOR gate 42 goes high and is inverted by inverter 64 to provide a low level clock pulse $CP_1$ (row 15). The $\overline{TP}_1$ timing pulse goes high at time $t_0$, whereupon the output of NOR gate 90 goes low, is inverted by inverter 92, and sets the start flip-flop 44 to activate the oscillator. The outputs of inverters 78 and 80 change after a delay of 0.75 $\mu$second provided by the delay device 76. The output of inverter 80 then goes high. This output, applied to the first NOR gate 42, terminates the $CP_1$ clock pulse. At the same time, the output of inverter 78 goes low (row 14). Both inputs to second NOR gate 48 then are low, since first control flip-flop 46 was set by the $\overline{TP}_1$ timing pulse at time $t_0$. The high output of second NOR gate 48 is inverted to provide a low level clock pulse $CP_2$ (row 16).

Timing pulse $TP_1$ terminates and second timing pulse $TP_2$ begins one $\mu$second after the start of operation (rows 1 and 2). Terminating the $TP_1$ pulse prevents further generation of $CP_1$ clock pulses. Timing pulse $\overline{TP}_2$ sets the second control flip-flop 52, and the (1) output thereof primes one input of third NOR gate 54. The outputs of inverters 78 and 80 in the oscillator change again at $t_{1.5}$. Second NOR gate 48 then becomes disabled and clock pulse $CP_2$ terminates (row 16). Both inputs to third NOR gate 42 are low, and the high output thereof is inverted to provide the $CP_3$ clock pulse (row 17).

Second timing pulse $TP_2$ terminates (row 2) and third timing pulse $TP_3$ (row 3) begins at time $t_{2.0}$. The $\overline{TP}_3$ pulse first controls flip-flop 46 so that no further $CP_2$ clock pulses can be generated. The $TP_3$ pulse is applied to fourth NOR gate 60. The outputs of inverters 78 and 80 again change state at $t_{2.25}$. The high output of inverter 80 disables third NOR gate 54 and terminates the $CP_3$ clock pulse (row 17). Both inputs to fourth NOR gate 60 are low at $t_{2.25}$. Inverter 70 inverts the high output of fourth NOR gate 60 to provide the $CP_4$ clock pulse (row 19). At the same time, the high output of fourth NOR gate 60 resets second control flip-flop 52 to prevent the further generation of $CP_3$ clock pulses, and resets the start flip-flop 44 by way of NOR gate 96 and inverter 98. Both inputs to the NOR gate 74 in the oscillator then are high. After a delay of 0.75 μsecond, at $t_{3.0}$, the outputs of inverter 78 and 80 change to their steady state condition and remain there until the start flip-flop 44 is again set. The high going output of inverter 78, applied to the fourth NOR gate 60, terminates the $CP_4$ clock pulse (row 19).

Timing pulse $TP_3$ terminates and timing pulse $TP_4$ commences at time $t_{3.0}$. The $TP_4$ timing pulse has no effect on the pulse generator since it is not used. At $t_{4.0}$, fourth timing pulse $TP_4$ terminates and fifth timing pulse $TP_5$ begins. The $TP_5$ timing pulse is applied to the fifth NOR gate 100, which also receives a low input at this time from inverter 80 (row 13). The high output of fifth NOR gate 100 is inverted to provide the $CP_5$ clock pulse (row 20). Also at $t_{4.0}$, the start flip-flop 44 is again set by way of NOR gate 90 and inverter 92, and third control flip-flop 118 also is set. Both inputs to the NOR gate 74 in the oscillator then are low and the output goes high. The outputs of the inverters 78 and 80 change after a delay of 0.75 μsecond, at $t_{4.75}$. The high going output of inverter 80, applied at fifth NOR gate 100 terminates the $CP_5$ clock pulse (row 20). At the same time, the low input to sixth NOR gate 102 enables that gate to provide the $CP_6$ clock pulse (row 21).

Timing pulse $TP_6$ begins at time $t_{5.0}$ (row 6), and the $\overline{TP}_6$ input sets the fourth control flip-flop 120. The outputs of inverters 78 and 80 change again at time $t_{5.5}$ to disable sixth NOR gate 102 and fully enable seventh NOR gate 104, thereby terminating the $CP_6$ clock pulse and commencing the $CP_7$ clock pulse (rows 21 and 22).

Sixth timing pulse $TP_6$ terminates and seventh timing pulse $TP_7$ begins at time $t_{6.0}$. $\overline{TP}_7$ resets the third control flip-flop 118, and the high output at the (1) terminal thereof prevents the further generation of $CP_6$ clock pulses. One input to the eighth NOR gate 106 is primed by the $TP_7$ timing pulse. The outputs of inverters 78 and 80 again change at time $t_{6.25}$ to disable seventh NOR gate 104 and fully enable eighth NOR gate 106. This terminates the $CP_7$ clock pulse and begins the $CP_8$ clock pulse (rows 22 and 23). Eighth NOR gate 108 has a high output (row 24) which is fed back to reset the fourth control flip-flop 120 and the start flip-flop 44, thereby (1) disabling the oscillator and (2) preventing further generation of $CP_7$ timing pulses. The outputs of inverters 78 and 80 switch to the steady state condition (rows 13 and 14) at time $t_{7.0}$. Oscillator 78 has a high output which disables the eighth NOR gate 106 to terminate the $CP_8$ clock pulse. Thereafter, no further clock pulses are genertaed until the start flip-flop is again set and further timing pulses are applied from the data processor.

It is believed apparent from the discussion of FIGURES 8 and 10 that other numbers of clock pulses may be generated by slight modifications within the spirit of the invention. It should also be understood that other types of square-wave oscillators may be employed in place of the NOR gate 74, delay 76 and inverters 78 and 80. For example,, the oscillator could include a crystal controlled oscillator having out-of-phase outputs applied to gates controlled by the (1) output of start flip-flop 44.

What is claimed is:

1. Apparatus for generating, during a given time period, a set of output pulses each having a duration X from an externally supplied set of input pulses supplied during the given time period and each having a duration $Y>X$, said apparatus comprising:
   - oscillator means having a period 2X;
   - means responsive solely to a given pulse of said externally supplied set of input pulses for enabling said oscillator means;
   - a series of coincidence gates equal in number to the output pulses to be generated during a said time period;
   - means coupling one input of each of said gates to said oscillator means;
   - means responsive to at least a plurality of said externally supplied input pulses for applying signals at the second inputs of said coincidence gates selectively.

2. Apparatus for generating, during a given time period, a set of output pulses each having a duration X from an externally supplied set of input pulses supplied during the given time period and each having a duration $Y>X$, said apparatus comprising:
   - oscillator means having a period $2X$ and having first and second out-of-phase outputs;
   - means responsive to at least one of said input pulses for controlling the operation of said oscillator means;
   - a series of coincidence gates;
   - means for applying the first output of said oscillator means to the first inputs of alternate ones of said series of gates;
   - means applying the second output of said oscillator means to the first inputs of the remainder of said gates; and
   - means responsive to at least a plurality of said externally supplied input pulses for applying a signal at the second input of each of said series of coincidence gates selectively timewise.

3. The apparatus as claimed in claim 2, wherein said oscillator means includes a square-wave oscillator, and wherein said first and second outputs are 180° out-of-phase.

4. Apparatus for generating, during a given time period, a first series of output timing pulses each having a duration X from an externally supplied, second series of input timing pulses supplied during said given time period and each having a duration $Y>X$, said apparatus comprising:
   - oscillator means including a square-wave oscillator having a period 2X, and having first and second outputs which differ in phase;
   - a plurality of bistable devices each being settable to one state under control of said input pulses;
   - said oscillator means being enabled by the output of the first one of said bistable devices;
   - a plurality of gates greater in number than said bistable devices and each being connected to receive one of the outputs of said oscillator means;
   - means for applying the output of each of said bistable devices except said first one to the input of a separate one of said gates; and
   - means for applying a different one of said input pulses to each of the other gates.

5. Apparatus for generating, during a given time period, a first series of output timing pulses each having a duration X from a second series of externally supplied input timing pulses supplied during said given time period and each having a duration of $Y>X$, said apparatus comprising:
   - a square-wave oscillator having a period $2X$, and having first and second outputs 180° out-of-phase;
   - a plurality of bistable devices;
   - means for applying selected ones of said input pulses to said bistable devices to set said devices to a first stable state, the output of the first one of said bistable devices being applied to control the operation of said oscillator;
   - a group of coincidence gates greater in number than said bistable devices and each having first and second inputs;
   - means applying the output of each of said bistable devices except said first one to the first input of a separate one of said gates;

means for applying a different one of said input pulses to the first input of each of the other gates;

means coupling the first output of said oscillator to the second inputs of alternate ones of said gates in said group; and means coupling the second output of said oscillator to the second inputs of the all other gates in said group.

References Cited by the Examiner

UNITED STATES PATENTS

| | | | |
|---|---|---|---|
| 3,162,815 | 12/1964 | Mogensen | 328—62 |
| 3,248,657 | 4/1966 | Turecki | 328—63 X |

ARTHUR GAUSS, *Primary Examiner.*

S. D. MILLER, *Assistant Examiner.*